United States Patent [19]
Horl

[11] 3,811,811
[45] May 21, 1974

[54] APPARATUS FOR SUPPORTING RELATIVELY MOVABLE COMPLEMENTAL MOLD PARTS

[76] Inventor: Gunter Horl, Esslinger Str., 7310 Plochingen, Germany

[22] Filed: Mar. 28, 1972

[21] Appl. No.: 238,791

[52] U.S. Cl.............................. 425/192, 425/444
[51] Int. Cl........................................ B28b 17/00
[58] Field of Search .......... 425/250, 251, 444, 242, 425/450, 185–189, 193, 195, 179, 192, 249, 338; 164/319, 243, 292, 349

[56] References Cited
UNITED STATES PATENTS

| | | | |
|---|---|---|---|
| 3,344,848 | 10/1967 | Hall et al. ....................... | 164/319 X |
| 2,852,879 | 9/1958 | Innerfield............................ | 425/193 |
| 3,433,292 | 3/1969 | McDonald ...................... | 425/444 X |
| 131,898 | 10/1872 | Partz.................................... | 425/193 |
| 2,881,478 | 4/1959 | Gruenberg.......................... | 425/195 |
| 3,431,601 | 3/1969 | Lipscomb .......................... | 425/195 |
| 3,596,318 | 8/1971 | Kyritsis.............................. | 425/242 |

*Primary Examiner*—J. Spencer Overholser
*Assistant Examiner*—John S. Brown
*Attorney, Agent, or Firm*—Edwin E. Greigg

[57] ABSTRACT

For ensuring accessibility to any desired location of a mold used in injection or cast molding, the support structure carrying the complemental and relatively movable mold halves includes a grate to which a mold half is directly affixed. The multitude of openings in the grate permits simultaneous accessibility to several desired locations at the associated mold half.

4 Claims, 2 Drawing Figures

APPARATUS FOR SUPPORTING RELATIVELY MOVABLE COMPLEMENTAL MOLD PARTS

BACKGROUND OF THE INVENTION

This invention relates to an apparatus for supporting, closing, maintaining closed and opening multipart molds. With at least one mold part there are associated means for the injection or casting of material, while a further mold part is provided with an ejecting device to remove the article formed. The mold parts are secured to mold supports relatively movable to one another. At least that support which carries the mold part into which the material is cast or injected, has a plate-like configuration and is provided with several openings for permitting injection or casting into this mold part at desired locations thereof.

In the German Utility Model No. 1,860,806 there is disclosed a mold table for the secure positioning of a mold provided with a circular opening in which there is rotatably supported a circular disc. The latter is provided either with at least one elongated slot or at least one bore. Thus, by rotating this circular disc, its opening or openings may be brought to any desired location of the mold, so that an injection or casting of the material may be effected at any desired mold location. This known apparatus has the disadvantage that the mold table is relatively expensive, and furthermore, there are cases in practice when it is necessary to have access not only to a single, but simultaneously to a great number of desired locations of the mold. Thus, there are cases when injection is to be performed at several locations simultaneously; further, besides the locations of injection, the desired location of an ejecting device or devices at the mold should also be accessible. In these cases, if the apparatus of the aforenoted known structure is utilized, for every different mold there is required a particularly designed and manufactured circular disc. Further, if the ejecting mechanism is disposed on that side of the mold which is oriented away from the location of injection or casting, then for that mold support a separate rotatable circular disc has to be used.

In U.S. Pat. No. 1,919,534 there is disclosed an injection and casting machine in which the lower mold table comprises openings through which ejection pins may project. During the opening of the mold, the ejection pins are driven against a stationary abutment and thus the formed article is ejected. In this known structure the lower mold table is constituted by a solid plate so that the latter has to be replaced together with the mold, since in a different mold in which the ejection pins are differently positioned, the bores of the mold table would be disposed at improper locations.

OBJECT, SUMMARY AND ADVANTAGES OF THE INVENTION

It is an object of the invention to provide, in machines of the aforeoutlined type, improved and inexpensive mold supports that are adapted for use with any desired mold having widely different locations for the injection or casting and for the ejection mechanisms.

Briefly stated, according to the invention, the mold supports associated with those mold parts which receive injecting, casting or ejection means are designed as a grate having a plurality of mutually substantially perpendicular strips defining a plurality of openings.

The use of a grate structure having the plurality of openings provides not only for an accessibility to any desired location of the secured mold, but it also ensures simultaneous accessibility to an arbitrarily great number of mold locations. Further, the mold support according to the invention, does not require an expensive and particular structure; inexpensive and commercially available grates may be used. Also, the grates render it unnecessary to perform a readjustment of the mold support upon replacement of a mold. Further, grate structures are much lighter than the solid mold supports of known devices; yet, they have an extraordinarily high rigidity.

The invention will be better understood as well as further objects and advantages become more apparent from the ensuing detailed specification of a preferred, although exemplary embodiment of the invention taken in conjunction with the drawing.

DESCRIPTION OF THE PREFERRED EMBODIMENT

Figure 2:
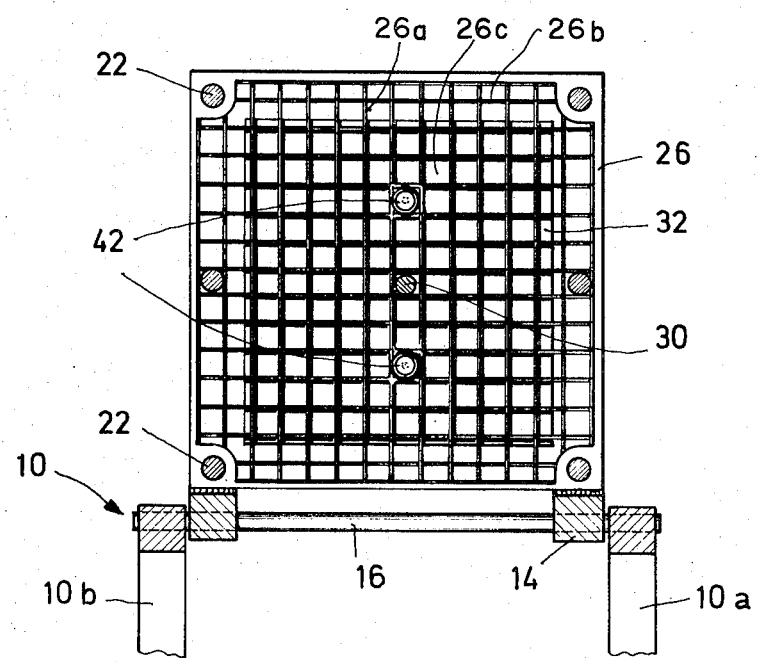

Turning now to the figures, there is shown the upper, work portion of a mold table 10 formed to two inverted U-shaped frame components 10a and 10b secured together by means of transversal struts, not shown. On the table there is positioned a mold-carrying rig generally indicated at 12, having at its lower part a rig frame 14. By means of an axle 16 supported in frame components 10a and 10b, the rig frame 14 is adapted to be swung in either clockwise or counterclockwise direction as it is apparent particularly from FIG. 2. The rig 12 is maintained fixedly in any set angular position by securing means not illustrated.

The rig 12 includes at one end a stationary grate structure 18 and, at the other end, a solid terminal plate 20. The plates 18 and 20 are connected and are maintained in a spaced relationship with respect to one another by means of a plurality of guide rods 22. the latter are provided at their ends with threads, not shown, on which there are mounted tightening nuts 24. Further, on the guide rods 22 there is slidably arranged a second grate 26 which is moved by a power cylinder 28 secured to the solid terminal plate 20. The cylinder 28 has a piston rod 30 which projects through the terminal plate 20 and is affixed to the movable grate 26.

The grates 18 and 26 are each constructed to include a plurality of mutually substantially perpendicular strips defining a plurality of openings. These strips are designated in Fig. 2 as 26a and 26b for the grate 26, and define openings 26c.

Figure 1:
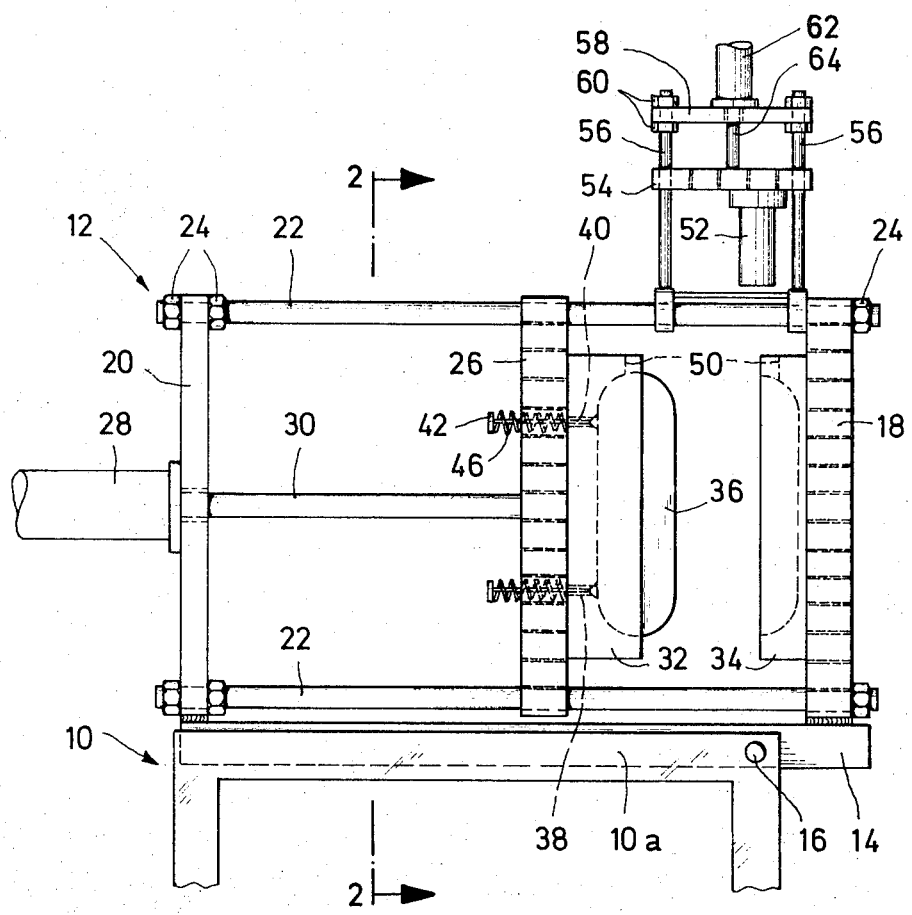
FIG. 1 is a schematic side elevational view of the preferred embodiment in an open position and FIG. 2 is a sectional view along line 2—2 of FIG. 1 (several components are omitted for the sake of clarity).

To the grates 18 and 26 there are tightened, by means of bolts, not shown, two mold halves 32 and 34. A molded article 36 disposed in the mold half 32 and made, for example, of synthetic material, is also illustrated in FIG. 1. In the mold half 32 there are provided bores 38 which receive and guide displaceable ejection pins 40, each provided, at its terminus remote from the mold half 32, with a head 42. The latter supports one end of a return spring 46, whereas the other end thereof engages the base of the mold half 32. Each spring 46 passes through the grate 26.

If, from its extreme right hand position, in which the two mold halves 32 and 34 constitute the closed mold proper, the grate 26 is shifted towards the left by means of the power cylinder 28, by virtue of the opening of the mold the ejection pins 40 automatically abut against the terminal plate 20 so that the finished article 36 is ejected from the mold half 32.

On the mold halves 32 and 34 there are shown complemental openings 50 for a core part 52 which is tightened by conventional means to a further movable grate 54, which may be constructed like the grates 18 and 26. For guiding the latter, there are provided two guide rods 56 which, at their lower end, are affixed to the upper guide rod 22 of the rig 12. At their upper end the guide rods 56 are connected by a terminal plate 58 secured to the rod ends by nuts 60. The terminal plate 58 carries a power cylinder 62, the piston rod 64 of which extends through the terminal plate 58 and is secured to the displaceable grate 54. In this manner the core component 52 may be moved into or out of the mold 32, 34.

The mold 32, 34 may have a casting spout (not shown) or the like at any desired location, since the grates 18 and 26 permit the attachment of an injection unit, including a nozzle head, practically at any desired location of the mold 32, 34. Prior to or during the injection of the material for forming the article 36, the rig 12 may be swung about the axle 16 in such a manner that a liquid injected material may flow into any desired cavity (not shown) of the mold chamber without the inclusion of air bubbles.

What is claimed is:

1. In an apparatus for supporting relatively movable complemental mold parts associated with an injection or cast molding machine, at least one of said mold parts adapted to receive material, the improvement comprising at least one grate constituting a carrier plate for fixedly receiving one of said mold parts, said grate having a plurality of mutually substantially perpendicular strips defining a plurality of openings within the outline of said mold part affixed thereto to permit simultaneous access to any desired location on said mold part, said strips being oriented perpendicularly to the plane of said grate.

2. An improvement as defined in claim 1, wherein at least one of said mold parts is provided with ejection pins extending outwardly therefrom, said ejection pins being accommodated within said openings irrespective of their location on said mold part.

3. An improvement as defined in claim 1, wherein said apparatus further has an additional support for carrying a core and means for moving said additional support and a grate forming part of said additional support and constituting a carrier plate for fixedly receiving said core.

4. An improvement as defined in claim 2, wherein said improvement further comprises an additional grate constituting a carrier plate for fixedly receiving the mold part which is provided with said ejection pins, said grate having a plurality of mutually perpendicular strips defining a plurality of openings within the outline of said last-named mold part.

* * * * *